(12) United States Patent
Casperson

(10) Patent No.: US 6,291,770 B1
(45) Date of Patent: Sep. 18, 2001

(54) WIRING SYSTEM AND METHOD THEREFOR

(75) Inventor: Paul G. Casperson, Columbus, IN (US)

(73) Assignee: Leoni Wiring Systems, Inc., Tucson, AZ (US)

( * ) Notice: Subject to any disclaimer, the term of this patent is extended or adjusted under 35 U.S.C. 154(b) by 0 days.

(21) Appl. No.: 09/312,567

(22) Filed: May 14, 1999

(51) Int. Cl.[7] .................................................. H02G 3/00
(52) U.S. Cl. ...................... 174/72 A; 439/76.2; 174/139; 174/52.2; 361/826; 361/827
(58) Field of Search ........................ 174/72 A, 139, 174/149 B, 154, 52.2; 361/826, 827, 828; 439/76.2

(56) References Cited

U.S. PATENT DOCUMENTS

| | | | |
|---|---|---|---|
| 3,668,299 | * 6/1972 | McNeal | 174/52 PE |
| 4,048,670 | * 9/1977 | Eysermans | 361/421 |
| 4,942,571 | 7/1990 | Moller et al. | 370/85.1 |
| 5,147,982 | * 9/1992 | Steffen | 174/52.2 |
| 5,623,169 | 4/1997 | Sugimoto et al. | 307/10.1 |
| 5,895,889 | * 4/1999 | Uchida et al. | 174/72 A |
| 5,995,380 | * 11/1999 | Maue et al. | 361/826 |
| 6,034,441 | * 3/2000 | Chen | 257/787 |
| 6,049,125 | * 4/2000 | Brooks et al. | 257/712 |

FOREIGN PATENT DOCUMENTS

| | | |
|---|---|---|
| 0 288 752 B1 | 7/1991 | (EP) . |
| 543469 A1 | 5/1993 | (EP) . |
| WO 96/38322 | 12/1996 | (WO) . |

* cited by examiner

Primary Examiner—Dean A. Reichard
Assistant Examiner—W. David Walkenhorst
(74) Attorney, Agent, or Firm—Snell & Wilmer

(57) ABSTRACT

A wiring harness for use in a networked wiring system wherein one or more multiplexed electronic circuits are contained within the wiring harness. Provision of such electronics within the wiring harness reduces the number of wires used in a networked wiring system without requiring their provision within sensor or actuator devices, or in external electronic boxes. Inclusion of such electronics within the wiring harness also eliminates the need for extra interconnections, and provides protection of the electronics from environmental conditions.

32 Claims, 5 Drawing Sheets

WIRING SYSTEM AND METHOD THEREFOR

FIELD OF THE INVENTION

The present invention relates generally to the field of electrical control systems. More specifically, the present invention relates to the field of wiring harnesses for use in electrical control systems in motor vehicles, aircraft, and industrial plants and facilities.

BACKGROUND OF THE INVENTION

Electrical systems for automobiles are becoming increasingly complex. Whereas the first automobiles had only simple lighting systems, today's vehicles can have well over a mile of wires connecting a myriad of devices to numerous microprocessors or electronic control units (ECU's). Thus, the electrical/electronic content of a modern automobile can exceed one third of the cost of the vehicle.

One reason for this proliferation of wires is that, traditionally, optional electronic functions are simply added onto a vehicle's basic electrical system. Thus, with each added function, additional wires are incorporated into the automobile. According to common current practice, each device typically has 2 or more dedicated wires connecting it to the ECU in charge of its functioning. Therefore, with the large number of electrically controlled devices found in modern automobiles, current ECU's have hundreds of wires connected to them. Each added wire brings the expense of the wire itself, and the expenses associated with the accompanying interconnections. A solution to this proliferation of wires is required.

As the volume of wires in automobiles increased, manufacturers began to rely on wiring harnesses in order to create manageable units for use in the manufacturing process. The earliest wiring harnesses were produced by bundling wires together with tape. Later, manufacturers began producing wiring harnesses made of molded semi-rigid or rigid corrugated plastic conduit or woven threading in order to protect the wiring from impact and other environmental conditions. Metal conduits have also been used as an alternative to hard plastics. Such harnesses are still in use today.

More recently, it has become possible to produce wiring harnesses out of synthetic materials which can be made soft or flexible in particular regions so as to aid in fitting the harness into the application, reduce vibrational noise, or to suit other such purposes. Such wiring harnesses are described in EPO Patent No. 0 288 752 B1.

One of the suggested solutions to the proliferation of wires has been the use of "smart" technology in the individual devices controlled by, or sending information to, the ECU. The use of smart technology in a device involves providing the device with the circuitry necessary to communicate with the ECU, and interpret and implement the commands provided by the ECU, and providing an ECU with suitable network capabilities, such as the multiplexing of device commands. By providing the device with a de-multiplexer, and using device-unique identifier information, commands may be multiplexed and sent from the ECU to various devices on the same cable, commonly known as a data link cable, with each device ignoring commands directed to other devices. Thus, the same data link cable can be used to serve multiple devices, and the amount of wiring required can be greatly reduced.

However, the incorporation of smart circuitry into each device is expensive. Smart circuitry typically consists of an analog/digital converter, a microprocessor, memory, a transceiver, a timing mechanism, often provided on a printed circuit board. These components and the boards themselves are expensive, particularly when the cost is multiplied over the number of devices which may be present in a modern automobile. For devices not already available in the market with smart circuitry, standard devices must be retooled and repackaged with smart circuitry, making this solution even less viable. Finally, in the case of engine systems, many devices are located in areas which are environmentally too severe to package electronics due to heat, vibration, and the presence of moisture.

Another suggested solution has been to provide smart electronics at points along the wiring system external to the wiring harnesses to handle the multiplexing functionality. This solution typically comprises providing electronic boxes spliced into the data link cable or involve incorporating smart electronics into already existing connectors. These additional boxes or connectors must be separately manufactured and incorporated into the wiring system, resulting in additional costs, interconnections, and failure points.

SUMMARY OF THE INVENTION

The present invention is carried out in one form by provision of a networked wiring system wherein one or more multiplexed electronic circuits are contained within one or more wiring harnesses. Thus, the wiring harnesses in the control system each contain the circuitry to effect communication between the ECU and various devices in a vehicle over a data link cable. Under conditions without great fluctuations in temperature, rigid plastic or metal conduit may be used to construct the overmold of the wiring harness. Under more extreme conditions, overmolds made of flexible synthetic materials such as foamed polyurethane allow for normal expansion and contraction without damaging the internal circuitry, and can be made watertight, so as to prevent damage caused by moisture.

The present invention provides a solution to the proliferation of wires in modern electrical control systems without the expense of incorporating circuitry into individual devices, adding discrete electronic boxes, or increasing the number of connector interfaces. Thus, the cost of materials is reduced, and manufacturing time and costs are saved. The present invention can be implemented without redesigning, replacing, or retooling existing devices.

An additional advantage provided by the present invention is the protection of sensitive circuitry from environmental stressors such as heat, cold, vibration, shock, moisture, and impact.

The present invention may be advantageously implemented into any electrical system, including those in motor vehicles, aircraft, industrial plants and facilities, where the cost and performance advantages of fabricating electronic circuits directly into a wiring assembly can by achieved.

BRIEF DESCRIPTION OF THE DRAWINGS

The present invention will hereinafter be described in conjunction with the appended drawing Figures, wherein like numerals designate like elements, and.

DETAILED DESCRIPTION OF THE EXEMPLARY EMBODIMENTS

Figure 4:
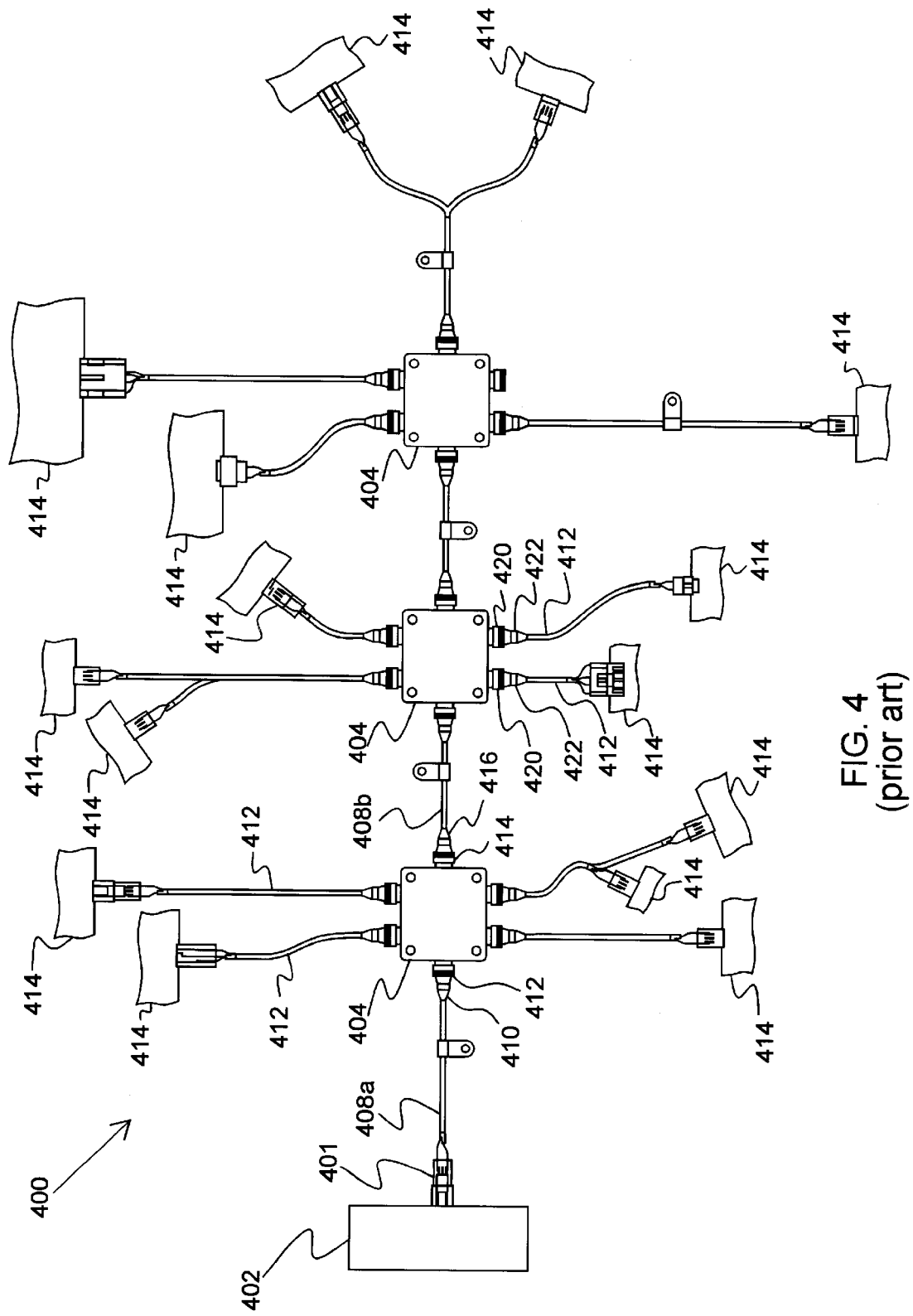
FIG. 4 is a top view of a control system in accordance with the prior art.

First with reference to FIG. 4, a control system 400 according to the prior art is shown. According to the prior art control system 400, smart electronics are provided inside electronic boxes 404, which are typically constructed of rigid metals or plastics. Communication between ECU 402 and electronic boxes 404 is conducted across ECU connector 401, a section of data link cable 408a, a first connector 410, and a second connector 412, which is connected to an electronic box 404. In order for messages to continue to other electronic boxes 404, the first electronic box 404 is connected to a third connector 414, which interfaces to a fourth connector 416, which is spliced to a second section of data link cable 408b. This same series of connector interfaces repeats for each additional electronic box 404 in prior art control system 400. Additionally, signals relayed from electronic boxes 404 to devices 414 over connection cables 412 must cross multiple interfaces, such as across connectors 420 and 422. At each such splice or interface, the strength of electronic signal may be diminished. Further disadvantages associated with the costs of providing electronic boxes 404 and coupling them into control system 400 with connectors 410, 412, 414, 416 420, 422, are also present in this form of the prior art.

Figure 1:
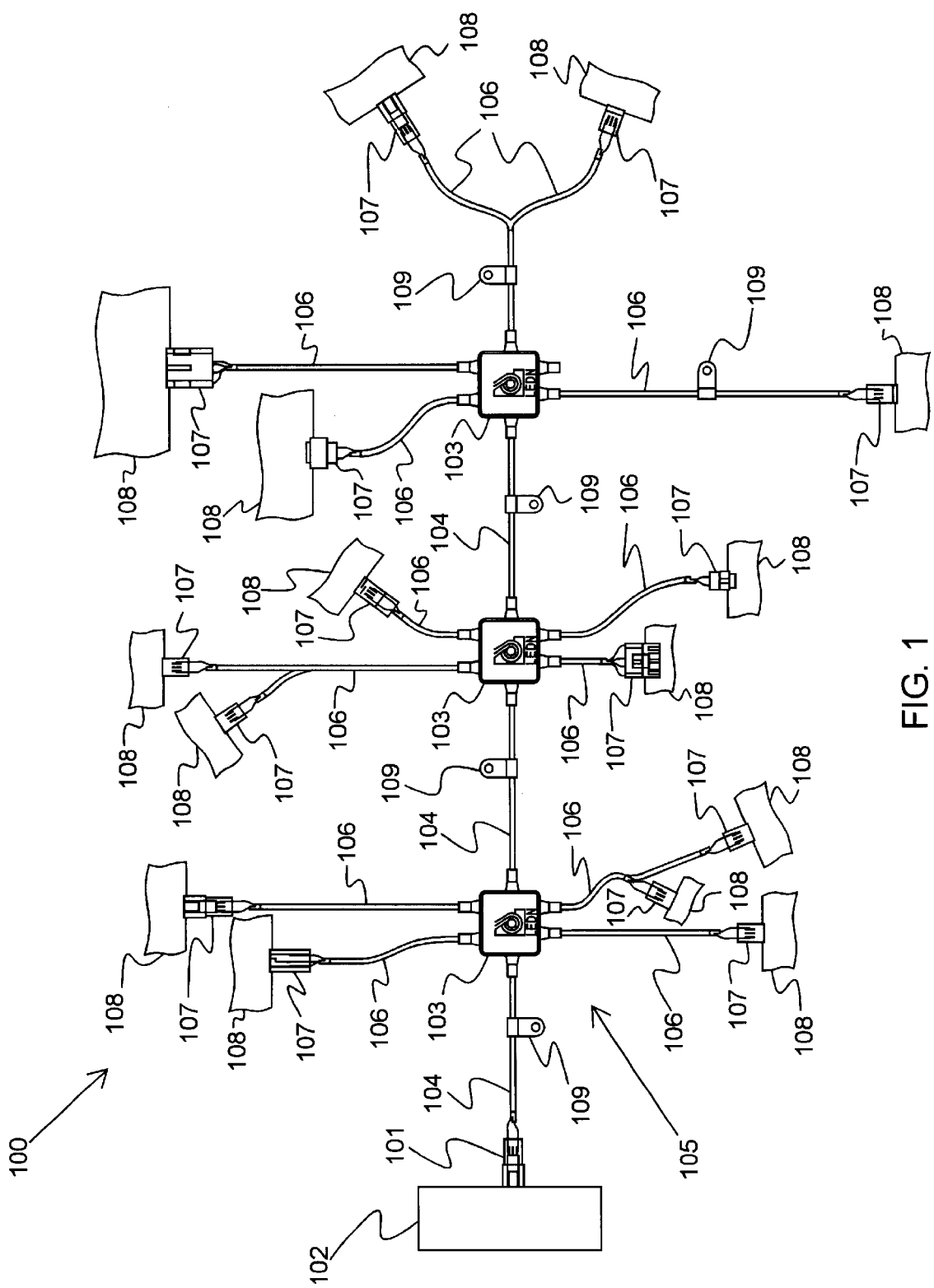
FIG. 1 is a top view of a control system in accordance with one embodiment of the present invention.

Referring now to FIG. 1, an electrical control system 100 in accordance with the present invention is depicted. Electronic Control Unit (ECU) 102 is connected to wiring harness 105 by data link cable 104 and ECU connector 101. Wiring harness 105 consists of one or more "smart nodes" 103, which are each connected to one or more devices 108, such as actuator and sensor devices, by connection cables 106 and connectors 107. As will be described in greater detail below, these smart nodes 103 are comprised primarily of electronic circuits which allow the smart nodes 103 to process signals, and to act as "mini-ECU's" in electrical control system 100, thus forming a control system in which ECU 102 is primarily responsible for the functioning of devices 108, while the smart nodes 103 function to buffer commands and data between ECU 102 and devices 108. Wiring harness 105 preferentially has mounting fixtures 109 for suitable attachment of wiring harness 105 to a frame or other structure.

Signals from ECU 102 travel along data link cable 104 to the smart nodes 103. Each smart node 103 interprets these signals to determine whether activation of a device 108 connected to it is required. Similarly, signals from devices 108 travel along connection cables 106 to the smart nodes 103, and each smart node 103 interprets these signals to determine whether the information should be forwarded to ECU 102. In this way, the devices 108 are each in communication with ECU 102 over a single data link cable 104, a smart node 103, and a branching connection cable 106. Devices 108 may be continuously sending or receiving information to or from ECU 102, or may send or receive information upon the occurrence of a given condition. Any suitable protocol for communications between the ECU 102 and the smart nodes 103 may be used. Examples of such protocols include SAE J1708/1587, SAE J1939, CAN, and high speed CAN.

Figure 2:
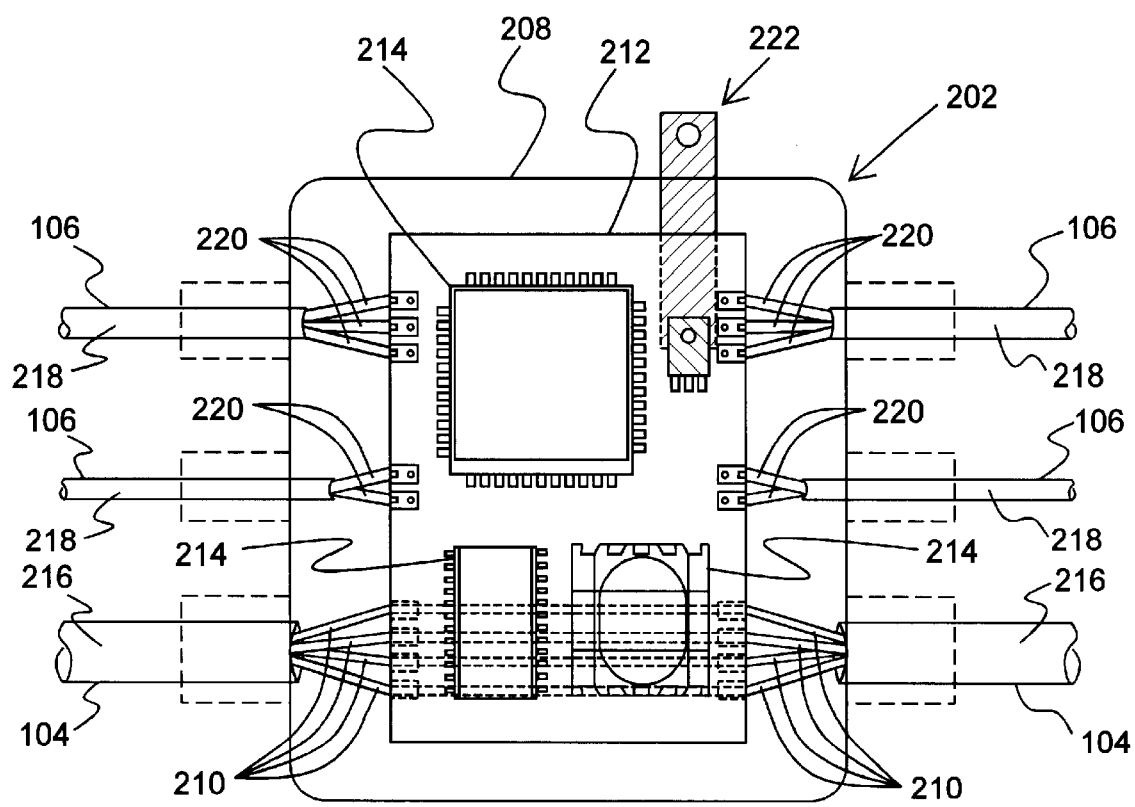
FIG. 2 is a top view of a smart node in accordance with another embodiment of the present invention.

Now with reference to FIG. 2, a close-up of a smart node 202 is shown. Smart node 202 comprises printed circuit board 212 with suitable electronic circuitry 214 disposed thereon, overmold 208, and data link cable 104 and connection cables 106 suitably connected to printed circuit board 212. Overmold 208 serves as the exterior casing of smart node 202, and may be constructed of a variety of materials, including rigid plastics or metals. In the preferred embodiment of the present invention, overmold 208 is constructed of a flexible synthetic material, such as foamed polyurethane or other flexible polymeric material. Foamed polyurethane provides the benefits a high level of environmental protection, and ease of manufacture, while not damaging solder connections, as do many prior art potting compounds. Overmold 208 fully encases smart node 202, and portions of data link cable 104 and connection cables 106.

In a typical application, such as a wiring system for an automobile, electronic circuitry 214 usually includes at least a microprocessor, a multiplexer/demultiplexer, a transceiver, and a synchronization clock, for use in processing higher level logic functions, such as interpreting and communicating multiplexed digital format information transmitted over data link cable 104 to or from ECU 102 (FIG. 1). Electronic circuitry 214 may also comprise electronics to measure conditions and convert the data to a signal, to enhance signals, convert signals, or to make corrections such as by controlling temperature or other devices. Such electronics are commonly referred to in the relevant art as "smart electronics." Provision will usually be made on smart node 202 for connection to power input and output, ground input and output, datalink high input and output, datalink low input and output, sensor power and actuator power, sensor ground and actuator ground, sensor signal, and sensor signal ground wires, such as data link wires 210 and connection wires 220, discussed in greater detail below.

In the event that the smart electronic circuitry 214 is used in connection with one or more actuator devices, such as lamps, heaters, solenoids, fuel injectors, pumps, and various other motors and engine components, suitable "driver" circuitry is included for causing activation of the actuator devices. Common sensor devices include devices such as thermistors, thermocouples, pressure sensors, fluid level switches, and various other engine sensors.

It will be understood that the particular electronic circuitry 214 for an application will vary with the application, and that various functions may be integrated into the same components. Further, printed circuit board 212 may comprise a rigid board, or may be made of one of the flexible materials now known in the art. Alternatively, printed circuit board 212 may be eliminated altogether, with the electronic circuitry being packaged directly within overmold 208, or by other suitable means.

With continuing reference to FIG. 2, connection cables 106 further comprise sets of connection wires 220, and, optionally, connection cable jackets 218. With additional reference to FIG. 3, data link cable 104 is comprised of a set of data link wires 210 running in unbroken contact across the bottom of printed circuit board 102, and, optionally, data link cable jacket 216.

Data link wires 210 are depicted as four individual wires, representing power, ground, data link high, and data link low. It will be appreciated, however, that the precise number of data link wires 210 utilized will vary per the application chosen. Thus, two, three, four, five, or more data link wires 210 may comprise the data link cable 104. Additionally, more than one data link cable 104 may be used, depending on the application.

Still with reference to FIG. 2, connection wires 220 are depicted as sets of two or three wires. Connection wires 220 for connection of smart node 202 to sensor devices commonly comprise power, ground, signal, and signal ground wires, though many sensors commonize the power and signal wires, and the ground and signal ground wires, thus necessitating only two or three wires. Connection wires 220 for connection of smart node 202 to actuator devices commonly comprise power and ground wires. It is possible to not use a ground return through the wiring harness. Thus, only one or two connection wires 220 may be necessary for an actuator device. Thus, it will be appreciated that the number of connection wires 220 will also vary suitably with a given application of the present invention.

Figure 3:
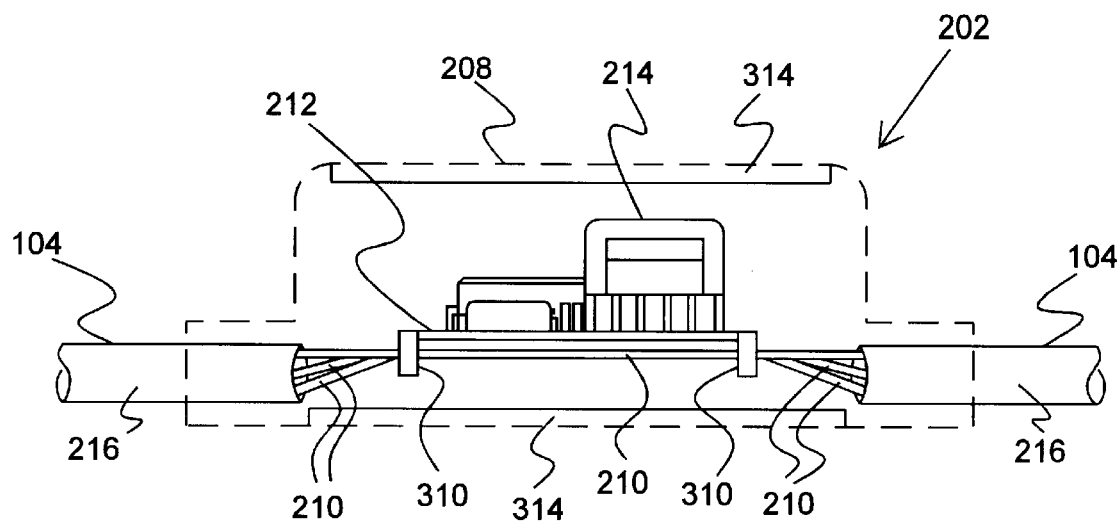
FIG. 3 is a side view of the smart node of FIG. 2.
Figure 3B:
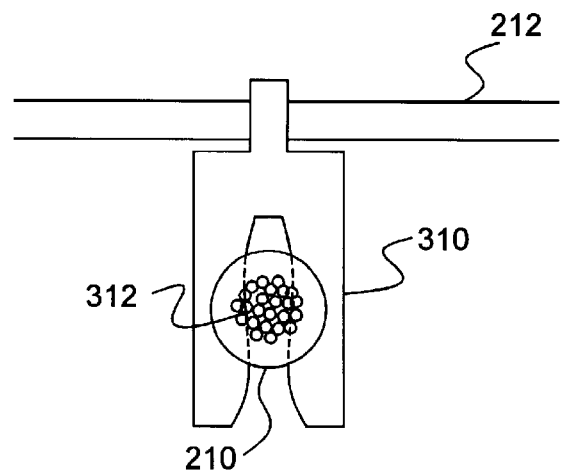
FIG. 3B is a close-up front view of an insulation displacement contact as in FIG. 3.

With reference to FIG. 3, uninterrupted contact between smart node 202 and ECU 102 (FIG. 1) may be achieved by the use of insulation displacement contacts 310, as are well known, though not previously used within a wiring harness for direct connection to a printed circuit board. FIG. 3B shows one insulation displacement contact 310 in contact with one data link wire 210. Insulation displacement contact 310 makes electrical contact with the electrically conductive strands 312 which comprise data link wire 210 by piercing the jacket of data link wire 210. Preferably, insulation displacement contact 310 may be provided with a protective plastic housing (not shown). Examples of suitable insulation displacement contacts include AMP-BARREL Terminals.

With continued reference to FIG. 3, insulation displacement contacts provide for electrical connection of the data link wires 210 to the printed circuit board 212 without the use of traditional wiring interconnects, which involve a wire to a first connector terminal crimp, a first connector terminal to a second connector terminal interface, a second connector terminal to a wire crimp, and then a solder joint to a printed circuit board. Such interconnects can be expensive, and can interrupt the flow of signals over data link cable 104. Optionally, connection wires 220 are also connected to printed circuit board 212 by insulation displacement contacts, though any of the wiring connections to printed circuit board 212 may be made by commonly known methods such as soldering, resistance welding, or ultrasonic welding. Further, any of the disclosed connection methods may also be used in an application of the present invention wherein the electronic circuit is not disposed on a printed circuit board.

Still with reference to FIG. 3, in the event that all or part of overmold 208 is formed of flexible material, stiffener plates 314 composed of any suitable material may be provided within the wiring harness to provide increased protection of the printed circuit board 212 or electronics 214 from strong impact, penetration, or harmful flexure.

With reference now to FIG. 2, regardless of the composition of overmold 208, in a further preferred embodiment of the present invention, as is known in the art, a heat conductor 222, composed of a thermally conductive material such as copper or aluminum may be attached to printed circuit board 212 in close proximity with heat generating components within smart node 202, such as the electronic circuitry comprising the smart nodes, and extend to a point external to overmold 208. Optionally, this material can be attached to a metallic frame or housing to further facilitate heat transfer. Thus, means for removing heat from smart node 202 is provided, while providing a means for securing and supporting smart node 202.

As is well known, the flow of electricity over wires such as data link wires 210 and connection wires 220 will create electromagnetic fields which may potentially interfere with other nearby electrical functions. Likewise, electromagnetic fields created by other sources may interfere with the signals transmitted over data link wires 210 and connection wires 220. Optionally, cable shields (not shown) may be provided around smart node 202, data link cable 104 and connection cables 106 to block such interference.

Figure 5:
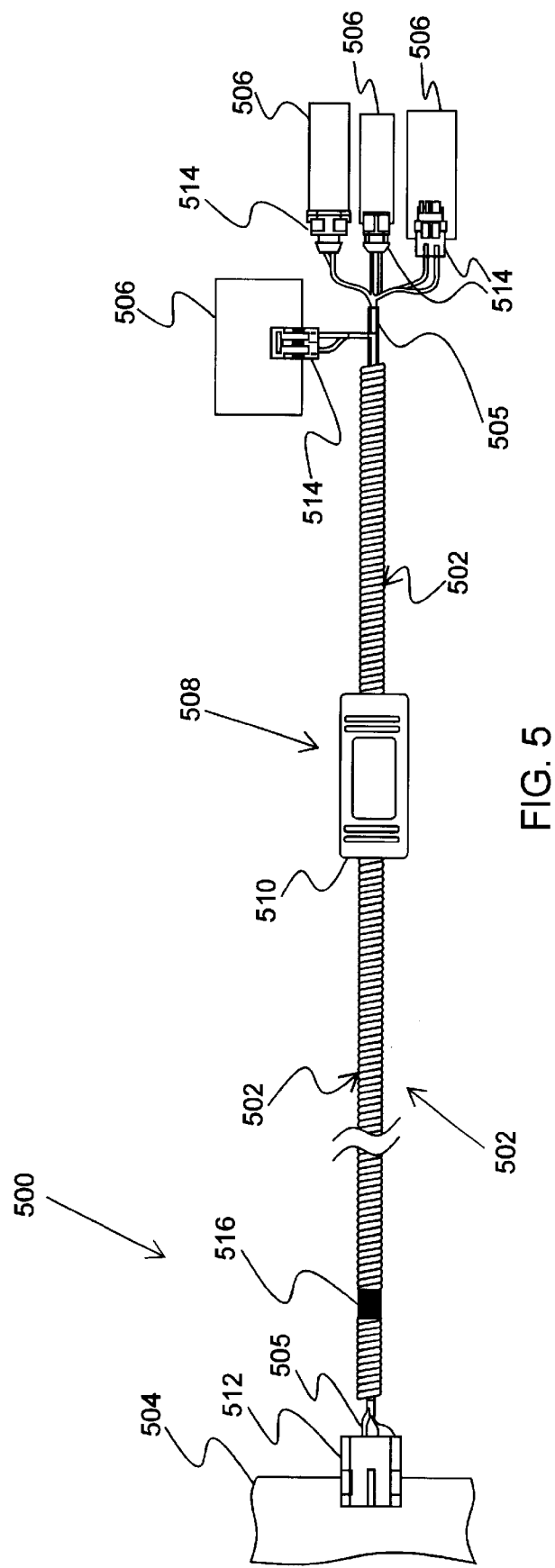
FIG. 5 is a top view of a control system in accordance with another embodiment of the present invention.

With reference to FIG. 5, an alternative embodiment of the present invention is depicted. Control system 500 comprises wiring harness 502, connected to ECU 504 and electronic devices 506. Wiring harness 502 comprises a single electronic node 508, containing an electronic circuit (not shown) for processing and relaying signals from electronic devices 506 to ECU 504 over wires 505 contained in wiring harness 502. Electronic node 508 is encased in polyurethane overmold 510, which also substantially extends over the length of wires 505. Wires 505 are in electrical contact with ECU connector 512 and device connectors 514, which mate in electrical contact with ECU 504 and electronic devices 506, respectively. Signals from electronic devices 506 travel to electronic node 508, which processes and/or relays signals to ECU 504. Polyurethane overmold 510 replaces and provides greater protection of wires 505 than traditional cable jackets. Wiring harness 502 may be provided with an identification tag 516.

It will be appreciated that the present invention may be implemented in various applications and ways other than the embodiments discussed above. While the principles of the invention have now been made clear in illustrative embodiments, there will be immediately obvious to those skilled in the art many modifications of structure, arrangements, proportions, elements, materials, and components used in the practice of the inventions which are particularly adapted for a specific environment and operating requirements without departing from those principles, or the scope of the invention, as set forth in the appended claims. For example various combinations of sensor devices and actuator devices may be connected to a given smart node. Further, the particular electronics, the number and combination of ECU's, wiring harnesses, and smart nodes, and the form of the overmolds may be varied in accordance with the requirements of a particular application.

What is claimed is:

1. A wiring harness for interconnecting, via a plurality of wires, an electronic control unit, a plurality of electronic devices controlled by said control unit, and a plurality of smart nodes connected therebetween, said wiring harness comprising:

said plurality of smart nodes;

said plurality of wires; and an overmold surrounding each one of said smart nodes and at least a portion of said wires to thereby integrate said wires and said smart nodes into said wiring harness.

2. The wiring harness as in claim 1 wherein said electronic devices are sensor devices.

3. The wiring harness as in claim 1 wherein said electronic devices are actuator devices.

4. The wiring harness as in claim 1 wherein said electronic devices are sensor and actuator devices.

5. The wiring harness as in claim 1 wherein said overmold comprises a flexible synthetic material.

6. The wiring harness as in claim 5 wherein said flexible synthetic material is foamed polyurethane.

7. The wiring harness as in claim 5 further comprising stiffener plates within said overmold.

8. The wiring harness as in claim 1, further comprising a thermally conductive material extending from inside said overmold to the exterior of said overmold.

9. The wiring harness as in claim 1, wherein said wires are electrically connected to said smart node by means of insulation displacement contacts.

10. The wiring harness as in claim 1, wherein said plurality of wires are electrically connected to said smart node along an unbroken length of each of said wires.

11. A wiring system comprising:
   a plurality of wires;
   an electronic circuit electrically connected to said wires, wherein said electronic circuit includes a demultiplexer for processing data multiplexed by an electronic control unit also electrically connected to said wires;
   at least one electronic device also electrically connected to said wires; and
   an overmold surrounding said wires and said electronic circuit and a length of each of said wires in proximity to said circuit to form an integrated wiring harness.

12. The wiring system as in claim 11 wherein said overmold comprises a flexible synthetic material.

13. The wiring system as in claim 12 wherein said flexible synthetic material is foamed polyurethane.

14. The wiring system as in claim 11 further comprising stiffener plates within said overmold.

15. The wiring system as in claim 11, further comprising a thermally conductive material extending from a position adjacent to said electronic circuit to the exterior of said overmold.

16. The wiring system as in claim 11, wherein said wires are electrically connected to said electronic circuit by means of insulation displacement contacts.

17. The wiring system as in claim 11, wherein said wires are electrically connected to said electronic circuit along an unsevered length of each of said wires.

18. The wiring system as in claim 11, wherein said electronic circuit is electrically connected to said electronic control unit by no more than four of said wires.

19. A method of integrating an electronic circuit into a wiring harness connected to a plurality of devices controlled by an electronic control unit comprising the steps of:
   connecting a plurality of wires in said wiring harness to said electronic circuit, wherein said wires are unbroken along an area of contact with said electronic circuit; and
   encapsulating said electronic circuit within said wiring harness.

20. The method according to claim 19 wherein said wiring harness is composed of flexible synthetic material.

21. The method according to claim 20 wherein said flexible synthetic material is foamed polyurethane.

22. The method according to claim 19 further comprising the step of encapsulating stiffener plates within said wiring harness.

23. The method according to claim 19, further comprising the step of encapsulating a thermally conductive material extending from within said wiring harness to a point outside of said wiring harness.

24. The method according to claim 19 wherein said wires are electrically connected to said electronic circuit by means of insulation displacement contacts.

25. A wiring system for an automobile comprising:
   a plurality of electronic circuits;
   a plurality of wires interconnecting said electronic circuits, and one of a plurality of overmolds surrounding each one of said electronic circuits, and surrounding a length of each of said wires in the region proximate to said electronic circuits.

26. The wiring system according to claim 25, wherein said electronic circuits include at least a first smart node, a second smart node, and a third smart node, each disposed with insulation displacement contacts;
   wherein said wires interconnecting said first, second, and third smart nodes are unsevered between said first, second, and third smart nodes, being connected by said insulation displacement contacts; and
   wherein said first, second, and third smart nodes include circuitry for processing multiplexed data.

27. The wiring system according to claim 26, wherein said overmolds comprise foamed polyurethane.

28. A wiring harness for an automotive vehicle comprising:
   an electronic node;
   a plurality of wires; and
   an overmold surrounding said electronic node and covering at least a portion of said plurality of wires.

29. The wiring harness according to claim 28 wherein said overmold comprises foamed polyurethane.

30. A wiring harness for interconnecting an electronic device with a component of an operational electrical system which are interactive with the electronic device, said wiring harness comprising,
   (a) a data link cable and a connection cable, each having one end connected with said electronic device, and each having a portion extending away from said electronic device and configured for connection with a component of an operational electrical system, and
   (b) an encapsulation encompassing (i) said electronic device, (ii) the connections between said electronic device with each of said data link and connection cables and (iii) predetermined amounts of each of the portions of said data link and connection cables extending away from the electronic device.

31. An electrical system portion forming part of an operational electrical system for a vehicle, comprising first and second electronic devices and a wiring harness associated with said first and second electronic devices and forming part of the operational electrical system, said wiring harness comprising,
   (a) a first data link cable and a first connection cable, each of which is connected with a respective portion of said first electronic device and each of which has a respective portion extending away from said first electronic device,
   (b) a second data link cable and a second connection cable, each of which is connected with a respective portion of said second electronic device and each of which has a respective portion extending away from said second electronic device, and
   (c) an encapsulation associated with each of said first and second devices, the encapsulation associated with a respective electronic device encompassing (i) the respective electronic device, (ii) the connections between the respective electronic device with each of the data link and connection cables associated with the respective electronic device and (iii) predetermined amounts of each of the portions of the data link and connection cables extending away from the respective electronic device;

wherein said first data link cable is configured for circuit communication with a vehicle electronic control unit, and said second data link cable is in circuit communication with each of said first and second electronic devices.

32. A method of forming an electronic circuit component for use in an operational electrical system of a vehicle, comprising the steps of (a) providing an electronic device which includes an assembly of electronic components and which is configured to provide a function in an operational electrical system of a vehicle, (b) providing a wiring harness connected to said electronic device and having a portion extending away from said electronic device and configured for connecting the electronic device to another component of an operational electrical system of a vehicle, and (c) encapsulating said electronic device, the connection between said wiring harness and said electronic device, and a selected portion of the wiring harness which extends away from said electronic device and is configured for connecting the electronic device to another component of an operational electrical system of a vehicle.

* * * * *